Figure 2:
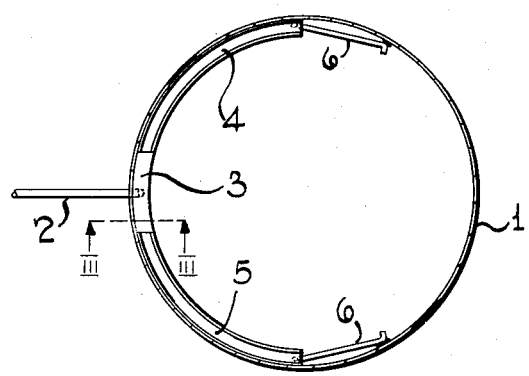

July 7, 1953

J. T. ROBERTS 2,644,612

STORAGE TANK FACILITY

Filed March 20, 1951

2 Sheets-Sheet 1

John T. Roberts Inventor

By W. O. J Heilman Attorney

July 7, 1953  J. T. ROBERTS  2,644,612
STORAGE TANK FACILITY
Filed March 20, 1951  2 Sheets-Sheet 2

John T. Roberts Inventor
By W. O. Heilman Attorney

UNITED STATES PATENT OFFICE 2,644,612

STORAGE TANK FACILITY

John T. Roberts, Baton Rouge, La., assignor to Standard Oil Development Company, a corporation of Delaware Application March 20, 1951, Serial No. 216,631

6 Claims. (Cl. 220—86)

The present invention is concerned with an improved process of handling and storing liquids which tends to vaporize and form vapors or which contain dissolved and/or entrained therein vapors and/or gases. In accordance with the present invention fluids of this character are introduced into a closed trough-like area comprising an integral part of a storage vessel. The fluid then passes through an open trough-like element and is then introduced into the bottom of the storage tank or vessel by means of enclosed downcomers. Thus, excessive foaming and spillage of liquids due to release of dissolved or entrained vapors or gases, and the ignition of liquids due to static electricity discharged when filling storage tanks and the like, is eliminated by the use of disengaging troughs and downcomers.

In many operations liquids under pressure are handled in a manner to reduce the pressure, thus, releasing entrained gases or vapors. For instance in one commercial operation, propylene, butylenes and/or amylenes are alkylated with isobutane in the presence of strong (85-98%) sulfuric acid in time tanks called reactors. The reactor product, a hydrocarbon-acid emulsion, is allowed to settle into a hydrocarbon and an acid phase. The hydrocarbon phase is then distilled to recover unreacted light hydrocarbons and various boiling range alkylates. The acid phase (spent acid) is diverted through intermediate storage tanks to acid concentration and carbon removal facilities. Under certain process operating conditions, it is not possible to completely remove all light hydrocarbons and alkylate from the spent acid before storing in cone roof tanks. As an example of the danger involved, on at least one occasion, when filling a spent acid tank from the bottom, light hydrocarbons were suddenly released from pressure causing the liquid in the tank to foam and boil over. The tank roof was split and approximately 500 tons of acid were spilled over the surrounding area. Such incidents might be avoided by filling the tank from the top, allowing the light hydrocarbons to disengage from the falling liquid stream. However, the heavy alkylate forms a layer floating on the surface of the heavier acid. In addition, the shearing action of liquid leaving the inlet line in a free fall is conducive to the generation of static electrical charges. On at least one occasion, the static charge build-up was sufficient to cause a spark which ignited the alkylate layer floating on the acid and resulted in a serious tank fire. Therefore, on liquid streams of this nature, it is impractical to use either top-filling or bottom-filling lines. A novel device to permit disengaging of light hydrocarbons through a minimum liquid volume and to conduct liquids to the bottom of the tank through an electrically grounded medium has been designed to remedy this situation. It consists of a box or trough with open top attached to the walls of the tank near the tank roof and electrically grounded to the tank. It may extend circumferentially, diametrically or in any other manner so long as it remains electrically grounded. Its cross-sectional shape is unimportant, with rectangular, semi-circular, triangular, etc. shapes being equally effective. The only qualification is that the shape provided the maximum practical liquid surface area for gas or vapor release and that the open area of the trough top be no less than the liquid surface area. Trough width should be sufficient to provide the maximum ratio of trough width to average liquid height. For the specific case discussed herein a ratio of 2–5 to 1 is suitable. Trough height should be sufficient to prevent liquid and/or foam overflow; a minimum height equivalent to 5 times the average liquid height is recommended. The use of wire screens or meshes across the top of the trough and well grounded electrically to the trough is recognized as an aid in preventing the entrainment of liquid in the escaping gas or vapor. Trough overall length should be sufficient to insure complete disengaging of all vapors and gas from the liquid. A length providing at least 90 sec. liq. holdup time is adequate for most installations. The liquid inlet nozzle should enter the trough perpendicular to its long axis and should be pointed toward the trough bottom to minimize liquid splashing. The inlet nozzle discharge should be no further from the trough bottom than a distance equivalent to the average liquid height at minimum liquid flow to insure submergence of the inlet nozzle discharge point. The trough top should be covered for a distance on either side of the inlet nozzle sufficient to insure against liquid splashing over the side of the trough. At the end or ends of the trough away from the inlet nozzles, downcomers are provided to convey the disengaged liquid down to the tank bottom. The downcomers should be of sufficient size and number to maintain a negligible liquid height at the downcomer entrance. Consideration should be given to the fouling or plugging characteristics of the liquid in sizing the downcomers. The downcomers should be inclined at an angle away from the vertical to maintain a constant liquid to metal contact, and should be electrically grounded to the trough and to the tank shell; a minimum deviation from the vertical of one inch per foot of downcomer length for each inch of downcomer diameter is recommended. To insure a liquid seal, the downcomer discharge should extend below the level of the storage vessel suction nozzle and should direct the liquid in a way such as to prevent a vortex-like phenomenon at the discharge point.

Figure 1:
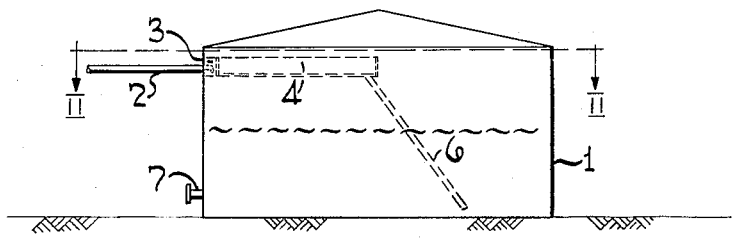
Figure 3:
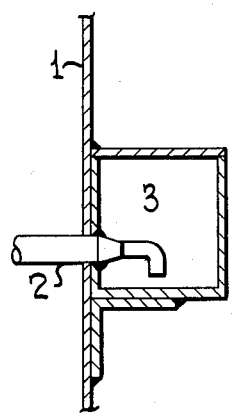
Figure 4:
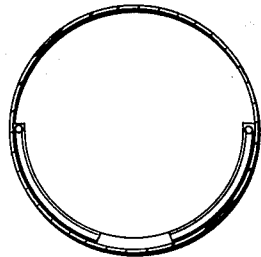
Figure 5:
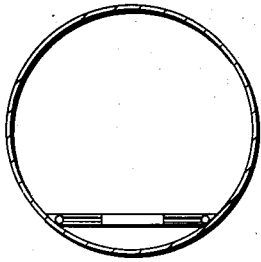
Figure 6:
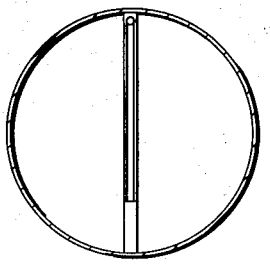
Figure 7:
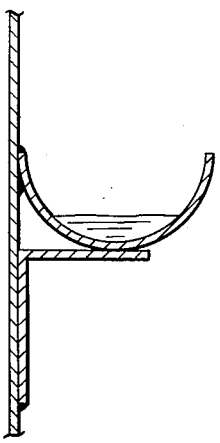
Figure 8:
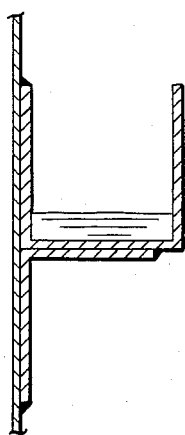
Figure 9:
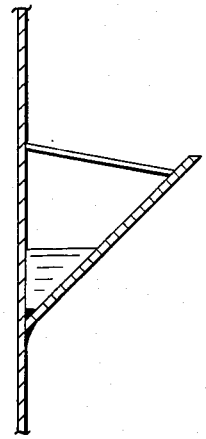

Thus, in accordance with the present invention, the use of open disengaging troughs provided with downcomers and positioned in the top of the tank permits a more efficient operation when filling these storage vessels or tanks. The invention may be more readily understood by reference to the drawings illustrating embodiments of the same. Figure 1 illustrates a disengaging trough positioned in the top of a tank together with downcomers. Figure 2 is a top view of the storage tank illustrated in Figure 1. Figure 3 illustrates the fluid inlet with respect to the closed portion of the trough. Figures 4, 5, 6, 7, 8 and 9 illustrate various embodiments of the trough of this invention.

Referring specifically to Figure 1 fluid containing entrained and/or dissolved gases or vapors is introduced into storage vessel 1 by means of feed line 2. The feed enters a closed section 3 of the trough and then flows through open sections 4 and 5 to a downcomer 6. The liquid flows down through the downcomer and is introduced below the liquid level at the bottom of the tank. Liquid is withdrawn from the vessel by means of conduit 7.

As pointed out, Figures 2 and 3 are top views showing details of the trough construction.

The foregoing description does not by any means cover the possible uses of the invention nor the forms which it may assume, but serves to illustrate its fundamental principles and an assembly in which the novel features as disclosed above have been incorporated. It is obvious that changes in the details may be made without departing from either its novel characteristics or the spirit and scope of the invention as defined in the appended claims.

The nature and objects of the present invention having been thus described and illustrated, what is claimed as new and useful and is desired to be secured by Letters Patent is:

1. In a storage vessel for use with liquids which tend to vaporize and form vapors or which contain dissolved or entrained vapors or gases therein comprising in combination a shell, an open-top trough positioned in the upper part of said shell, said trough being electrically grounded to said shell, a liquid inlet nozzle discharging into and toward the bottom of said trough, the discharge of said nozzle being no farther from the trough bottom than a distance equivalent to the average height of liquid within said trough at minimum liquid flow conditions, at least one enclosed downcomer electrically grounded to said trough and adapted to convey liquid from within said trough to a position near the bottom of said shell, said downcomer deviating from the vertical so as to maintain constant contact between liquid within said downcomer and the downcomer itself, and an outlet connection piercing said vessel at a position above the lower end of said downcomer.

2. A storage vessel as defined in claim 1, in which a portion of the trough in the vicinity of the inlet nozzle is covered.

3. A storage vessel as defined in claim 1, in which the downcomer deviates from the vertical to an extent of at least one inch per foot of downcomer length per inch of downcomer diameter.

4. A storage vessel as defined in claim 1, in which the trough has a top open area at least equal to the exposed surface area of liquid contained within said trough.

5. A storage vessel as defined in claim 1, in which the downcomers are located at the ends of the trough farthest away from the inlet nozzle.

6. A storage vessel as defined in claim 1, in which the trough is adapted to provide at least 90 seconds' liquid hold-up time, said trough having a depth of about 5 times the average liquid height within the trough.

JOHN T. ROBERTS.

References Cited in the file of this patent

UNITED STATES PATENTS

| Number | Name | Date |
|---|---|---|
| 1,549,150 | Pope | Aug. 11, 1925 |
| 2,043,223 | Baumes | June 9, 1936 |
| 2,115,016 | Ehlers | Apr. 26, 1938 |

FOREIGN PATENTS

| Number | Country | Date |
|---|---|---|
| 879,204 | France | Nov. 10, 1942 |